United States Patent
Greenslade

(10) Patent No.: US 7,142,357 B2
(45) Date of Patent: Nov. 28, 2006

(54) NIGHT-DAY BORESIGHT WITH ADJUSTABLE WEDGE-PRISM ASSEMBLY

(75) Inventor: Ken Greenslade, Mims, FL (US)

(73) Assignee: Knight's Armament Company, Titusville, FL (US)

( * ) Notice: Subject to any disclaimer, the term of this patent is extended or adjusted under 35 U.S.C. 154(b) by 130 days.

(21) Appl. No.: 10/994,548

(22) Filed: Nov. 22, 2004

(65) Prior Publication Data

US 2006/0109544 A1   May 25, 2006

(51) Int. Cl.
   *G02B 23/12* (2006.01)
(52) U.S. Cl. ............ 359/353; 359/399; 359/831; 42/122
(58) Field of Classification Search ............... 359/353
   See application file for complete search history.

(56) References Cited

U.S. PATENT DOCUMENTS

| | | | |
|---|---|---|---|
| 3,627,429 A | * | 12/1971 | Jaenicke et al. ............ 356/153 |
| 4,822,994 A | * | 4/1989 | Johnson et al. ....... 250/214 VT |
| 4,961,278 A | * | 10/1990 | Johnson et al. ............... 42/122 |
| 5,862,001 A | * | 1/1999 | Sigler ......................... 359/832 |
| 5,867,915 A | * | 2/1999 | McMillan ..................... 42/123 |
| 5,892,617 A | * | 4/1999 | Wallace ...................... 359/353 |
| 6,131,294 A | * | 10/2000 | Jibiki ........................... 42/119 |
| 6,172,821 B1 | * | 1/2001 | Isbell et al. ................. 359/809 |
| 2002/0109914 A1 | * | 8/2002 | Meier ......................... 359/399 |

OTHER PUBLICATIONS

Description/Figure of a Boresighting System—Origin Unknown ("Ref #1").
Technical Manual, "Elementary Optics and Application to Fire Control Instruments" Dept. of the Army p. 185 Def'n "Correction Wedge".

* cited by examiner

*Primary Examiner*—Drew A. Dunn
*Assistant Examiner*—Derek S. Chapel
(74) *Attorney, Agent, or Firm*—Opticus IP Law, PLLC

(57) ABSTRACT

An in-line night-day boresight with an adjustable wedge-prism assembly is disclosed. The adjustable wedge-prism assembly includes two opposing wedge prisms that are axially rotatable relative to each other. The assembly is arranged in the optical path between the night optics and the day optics. The adjustable wedge-prism assembly allows for compensation of image shift errors introduced by the night optics due to manufacturing errors in the night optics. This in turn allows for a cost-effective and easily aligned in-line night-day boresight.

12 Claims, 7 Drawing Sheets

NIGHT-DAY BORESIGHT WITH ADJUSTABLE WEDGE-PRISM ASSEMBLY

FIELD OF THE INVENTION

The present invention relates to boresights, and in particular relates to in-line night-day boresights, and apparatus and methods for aligning same

BACKGROUND OF THE INVENTION

Boresighting optical systems ("boresights") are used for long-range weapons, such as rifles, to allow the weapon's user to view a target and align the weapon relative to the target, e.g., to a select bullet impact point. A typical boresight includes an alignment mechanism used to align the weapon and boresight relative to the target, e.g., to the desired bullet impact point. An example alignment mechanism is a cross-hair reticle wherein the boresight is adjusted ("aligned") so that the reticle cross-hairs match the desired bullet impact point for a given target distance. Additional adjustments may be made to realign the boresight to the bullet impact point to take into account such factors as windage, distance, and bullet caliber. Finding the proper boresight alignment for a given set of conditions often involves trial and error, which is time consuming and not always convenient. Consequently, one would generally prefer to perform boresight alignment and/or realignment as infrequently as possible.

Certain types of boresights have both day-vision and night-vision capability, and are referred to herein as "night-day boresights." Night vision capability is provided by a night-vision optical system, referred to hereinafter as "night optics." Likewise, the day-vision capability is provided by a day-vision optical system, referred to hereinafter as "day optics." Because night optics have different imaging capabilities than day optics and includes an image intensifier, the optical design of the night optics is different than the day optics. Accordingly, the night optics and the day optics are typically separate optical systems, even when combined in the same housing.

There are three basic approaches to using both night optics and day optics on the same weapon. The first approach involves having separate night optics and day optics boresights and simply replacing one with the other as desired. However, this requires "rezeroing" each boresight every time it is installed on the weapon. Also, it is not always convenient to swap boresights, such as in combat or hunting situations since, among other things, there is often precious little time to rezero and align (e.g., by shooting at a target) after replacing one boresight with another.

The second approach involves integrating the day and night optics by combining the night optics and day optics optical paths using an adjustable mirror or beamsplitter. While this approach does not require physically swapping the night and day optics, it is still problematic because it requires boresight realignment when switching from the night optics to the day optics.

The third approach involves "clipping on" the night optics to the day optics. In one version of this approach, the night optics is clipped to a mount that holds the night optics above the day optics. A beamsplitter or mirror is then mounted in front of the day optics to project the night image down from the night optics into the day optics. The position of the mirror is then adjusted to obtain the required boresight alignment. Typically, the mirror or beamsplitter is adjusted until the two lines of sight are parallel, being offset by the difference in mounting height. A predictable point of impact is then available when using the night optics to augment the day optics for night time use.

In another version of the third approach, the clip-on night optics is mounted in front of (or "in line with") the day optics. In this arrangement, the night optics is said to be optically "upstream" of the day optics, i.e., the night optics is closer to the target and so receives light prior to the day optics.

FIG. 1 is a schematic diagram of an in-line night-day boresight 10 shown mounted to a platform, such as a weapon barrel 14. Boresight 10 includes removable night optics 20 having an input end 22 and an output end 24. Night optics 20 is arranged upstream of and in line with day optics 30 for nighttime viewing and is removed for daytime viewing. Day optics 30 has an input end 32 adjacent the night optics output end 24, and an output end 34 opposite input end 32. Night optics 20 and day optics 30 are arranged along an optical axis A1. A user 50 is shown viewing through the boresight at output end 34 of day optics 30.

In the operation of boresight 10, light 52 from a distant target (not shown) enters the input end 22 of night optics 20 and is incident an image intensifier tube 56, which outputs intensified (amplified) light 60. The intensified light 60 is then relayed to input end 32 of day optics 30 and is relayed to output end 34 to be viewed by user 50. While night optics 20 is designed for use in combination with day optics 30, the inevitable manufacturing errors (e.g., mechanical misalignments and tolerance errors) in night optics 20 cause light 60 to take a different path 61 (dashed line). The difference in paths 60 and 61 corresponds to an image shift IS of an amount $\Delta$ as seen by user 50. This image shift typically corresponds to an angular error of about 10 to 15 minutes (i.e., ~10'-15') of arc.

Reducing or eliminating this image shift has been achieved in several different ways. One way is to determine the alignment error due to the image shift due arising from the presence of the night optics, and dial this error into the day optics. Unfortunately, this approach is not preferred because the user has a different set of adjustments when using the night optics and the day optics. Another way is to adjust the optical centerlines during assembly to keep the image shift within a usable margin of error. While this can work in principle, it adds cost to the assembly and testing, with the latter having to be performed frequently until the assembly "settles" due to weapon shock. Yet another way is to provide mechanical adjustment capability to the night optic and day optic mounts. While this is a straightforward solution to reducing or eliminating the resultant image shift, it is not desirable because realignment needs to be performed every time the night optics is mounted and dismounted.

SUMMARY OF THE INVENTION

A first aspect of the invention is a boresight apparatus. The apparatus includes day optics and removable night optics. The night optics is arranged along an axis, and the day optics is arranged along the same axis optically downstream of the night optics. The day optics is optically coupled to the night optics when the night optics is present. The apparatus also includes an adjustable wedge-prism assembly. The assembly is arranged between the night optics and day optics, and preferably arranged at the output end of the night optics and incorporated into the night optics. The assembly includes first and second opposing wedge prisms. The prisms are rotatably adapted to compensate for an image shift in the day optics caused by manufacturing (e.g., assembly) errors in the night optics.

A second aspect of the invention is an image-shift adjustor apparatus for an in-line boresight that has a first optical system and a downstream second optical system. The first and second optical systems may be, for example, night optics and day optics, respectively. The apparatus includes first and second opposing wedge prisms arranged between the first and second optical systems. The wedge prisms are independently rotatable so as to reduce or eliminate an image shift in the second optical system caused by the first optical system.

A third aspect of the invention is a method of aligning a boresight having in-line night optics and day optics. The method includes determining a first boresight alignment by aligning the day optics to a desired bullet impact point on a target. The method also includes adding the night optics and an adjustable wedge-prism assembly in line with and upstream of the day optics. The assembly has first and second opposing wedge prisms and is arranged between the night optics and the day optics. The method further includes determining an image shift in the desired bullet impact point due to the presence of the night optics. The method also includes adjusting the adjustable wedge-prism assembly to reduce or eliminate the image shift.

A fourth aspect of the invention is a method of reducing or eliminating an image shift in an in-line boresight that has a first optical system and a downstream second optical system. The method includes arranging first and second opposing and independently rotatable wedge prisms between the first and second optical systems. The method further includes rotating at least one of the wedge prisms so as to reduce the image shift.

DETAILED DESCRIPTION OF THE INVENTION

Apparatus

Figure 1:
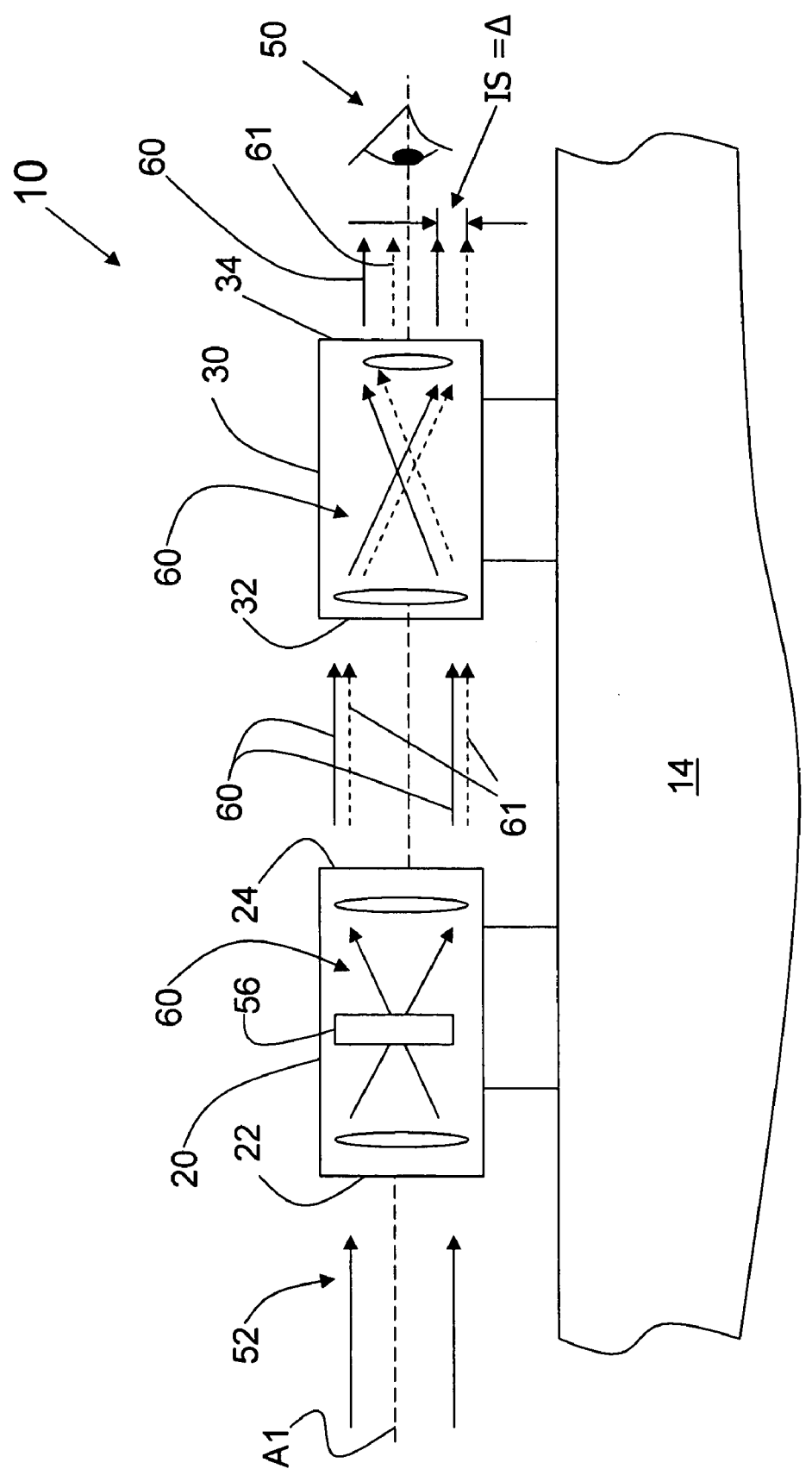
FIG. 1 is a schematic diagram of an example boresight mounted to a gun barrel, wherein the boresight includes a night optics arranged in-line and upstream of day optics, illustrating the image offset that arises in such an in-line arrangement due to manufacturing errors in the night optics.
Figure 2:
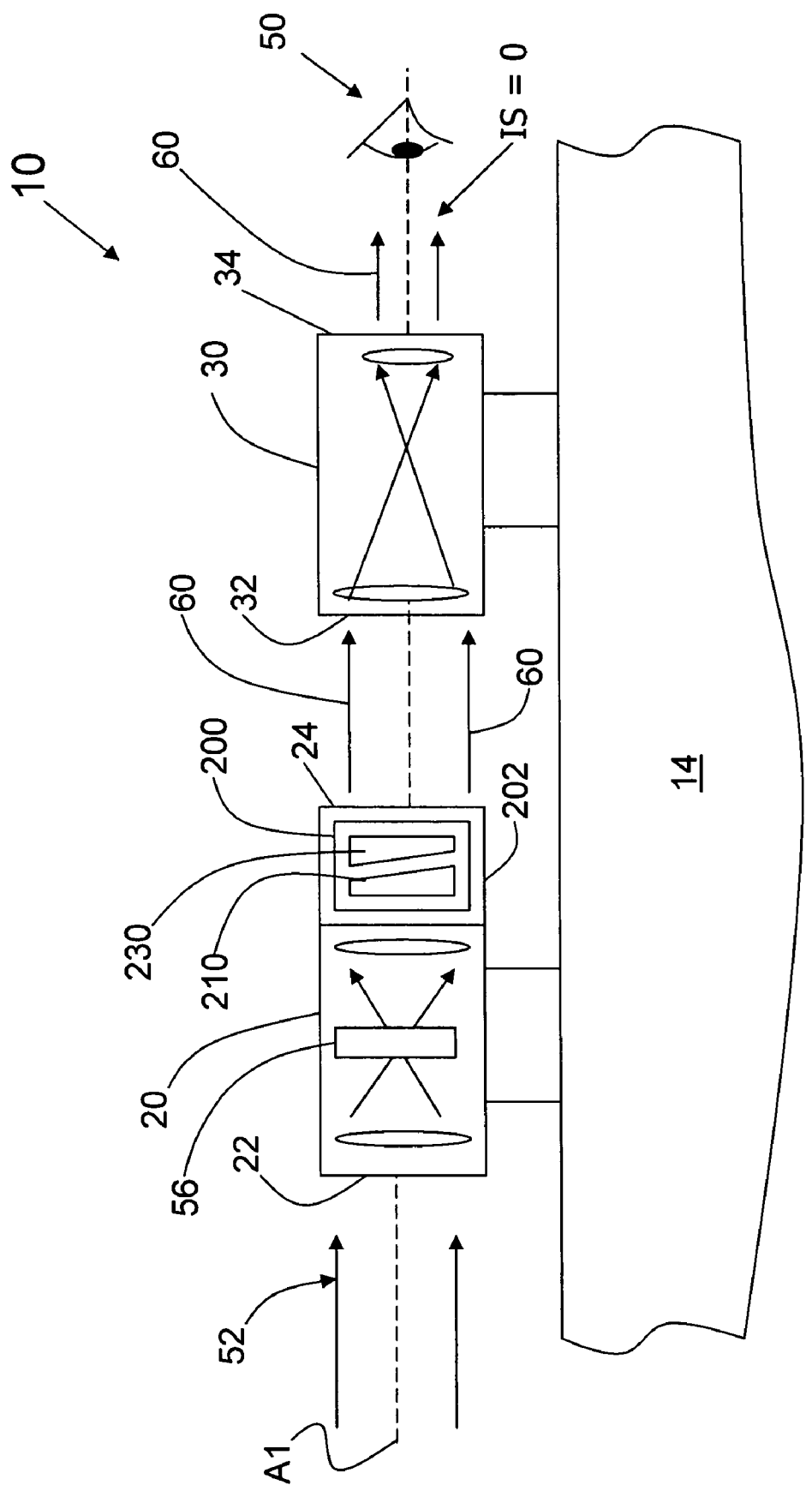
FIG. 2 is a schematic diagram similar to that of FIG. 1, illustrating the adjustable wedge-prism assembly used in the boresight to reduce or eliminate the image shift between the day optics and the night optics.
Figure 3:
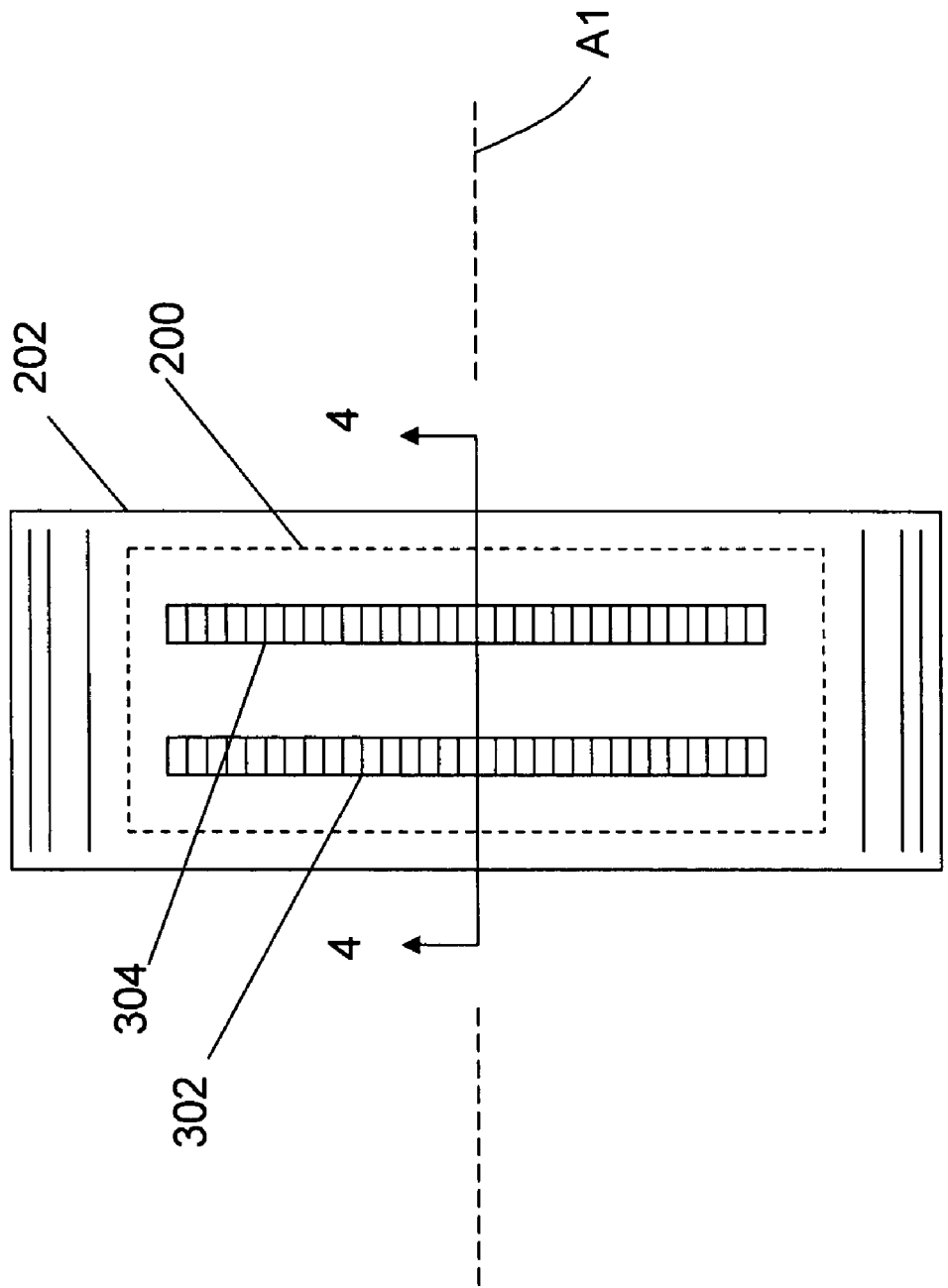
FIG. 3 is a close-up side view of the adjustable wedge-prism assembly rotatably mounted in an outer housing, showing an example manual wedge-prism adjusting means in the form of dials mechanically coupled to retainers that hold the wedge prisms in the outer housing and that allow for manual rotation of one or both of the wedge prisms.
Figure 4:
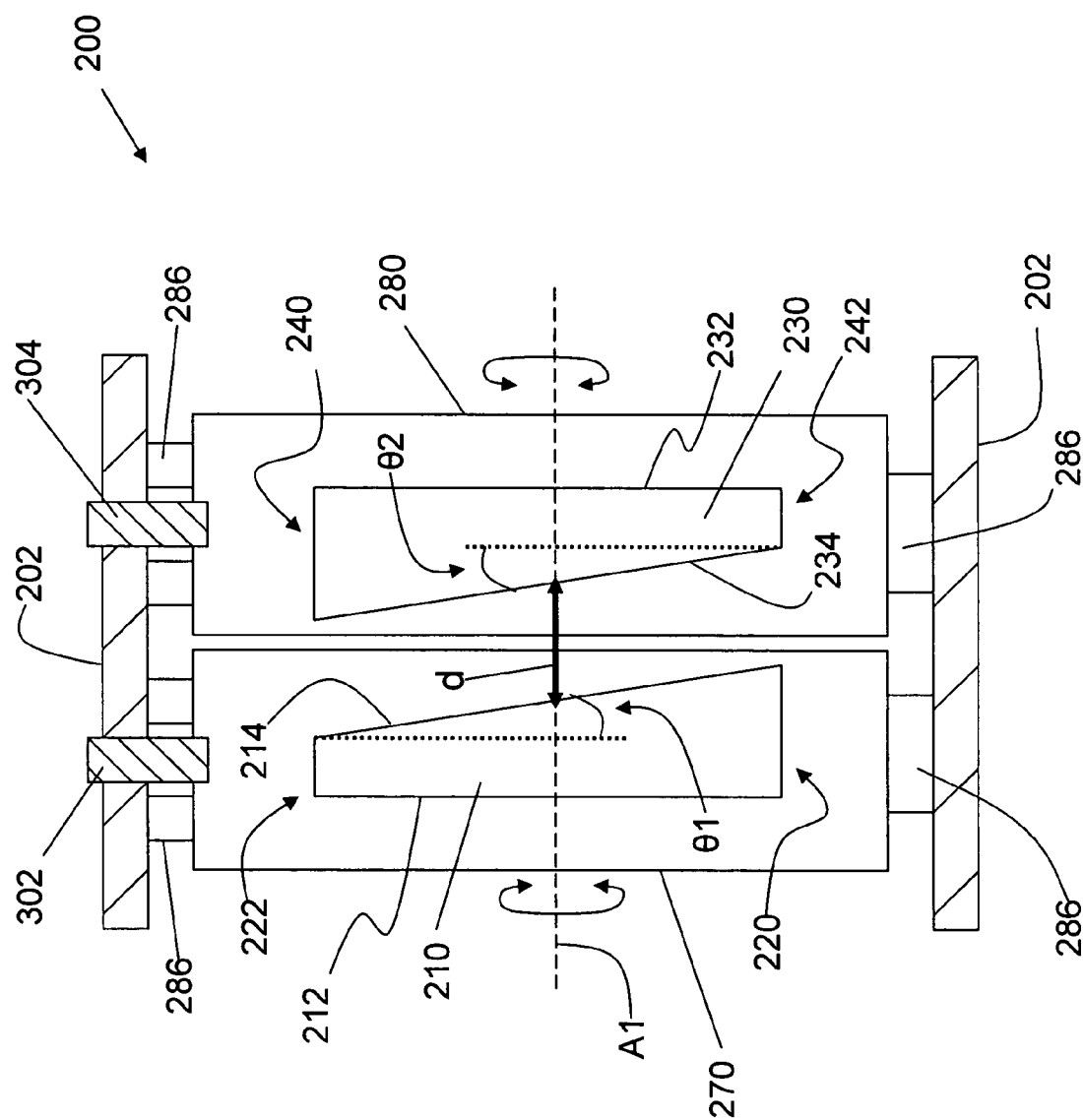
FIG. 4 is a cross-section view of FIG. 3 taken along the line 4-4, showing the wedge prisms being rotatably held by respective retainers within the outer housing.

FIG. 2 is a schematic diagram similar to that of FIG. 1, further including a adjustable wedge-prism assembly 200 arranged in the optical path between day optics 30 and night optics 20. In an example embodiment, adjustable wedge-prism assembly 200 is arranged immediately adjacent output end 24 of night optics 20, as shown. FIG. 3 is a close-up side view of adjustable wedge-prism assembly 200 (dashed line) as held in an outer housing 202. FIG. 4 is a cross-sectional view of adjustable wedge-prism assembly 200 and outer housing 202 taken along the line 4-4.

With particular reference to FIGS. 2 and 4, in an example embodiment, adjustable wedge-prism assembly 200 includes a first wedge prism 210 having a planar surface 212 perpendicular to axis A1. Prism 210 also includes a planar wedge surface 214 opposite perpendicular planer surface 212 and having a wedge angle $\theta 1$ relative to axis A1. Wedge prism 210 has a thick end 220 and a thin end 222.

Assembly 200 also includes a second wedge prism 230 axially spaced apart from prism 210 by a distance d. Prism 230 has a planar surface 232 perpendicular to axis A1. Prism 230 also includes a planar wedge surface 234 opposite perpendicular planer surface 232 and having a wedge angle $\theta 2$ relative to axis A1. Wedge prism 230 has a thick end 240 and a thin end 242.

Prisms 210 and 230 are arranged in opposition, i.e., with their wedge surfaces 214 and 234 facing one another so that thin end 222 of prism 210 is adjacent thick end 240 of prism 230, and thick end 220 of prism 210 is adjacent thin end 242 of prism 230. Prisms 210 and 230 are each independently rotatable about axis A1. The separation distance d is selected so that prisms 210 and 230 do not make contact when either is rotated relative to the other. In a preferred example embodiment, wedge angles $\theta 1$ and $\theta 2$ are equal (i.e., $\theta 1 = \theta 2 = \theta$), and this equal-angle example embodiment is considered hereinbelow for the sake of discussion, and the wedge angles are collectively referred to as $\theta$. In an example embodiment, wedge prisms 210 and 230 are identical in shape, size and composition.

In an example embodiment, wedge angles $\theta$ are in the range between about 1' and about 15' of arc, which allow for compensating the typical image shifts that arise due to the usual night optics manufacturing errors. Naturally, larger wedge angles can be employed where larger image shifts are anticipated or measured.

In an example embodiment, wedge prisms 210 and 230 are made from standard optical glass having excellent transmission in the visible and near infrared. An example of such an optical glass is BK-7, available from Schott Glass, Inc. of Duryea, Pa. Also in an example embodiment, one or more of the prism surfaces 212, 214, 232 and 234 have an antireflection coating formed thereon and designed to improve the overall optical transmission of assembly 200. The antireflection coating preferably has a broad passband and covers the visible and near-infrared (e.g., 430 nm-730 nm). In particular, it is preferred that the antireflection coating passband include the output wavelength of the image intensifier tube 56 in night optics 20.

In an embodiment, wedge prisms 210 and 230 are housed in respective individual prism retainers 270 and 280. In an example embodiment, retainers 270 and 280 are rotatably mounted within an outer housing 202 (e.g., a lens tube). This can be accomplished in a number of ways, such as via rotatable mounts 286, e.g., in the form of slip-rings. In an example embodiment, wedge-prisms 210 and 230 are circular in shape, as is usually the case for boresight optical elements.

In an example embodiment, retainers 270 and 280 are manually rotatable with respect to one another (or rotatable together) using any of the known means of the prior art. For the sake of illustration, retainers 270 and 280 are shown to include respective dials 302 and 304 so that the rotation of one of the dials results in a corresponding rotation of the retainer to which is it mechanically coupled. In an example embodiment, retainers 270 and 280 are mechanically coupled to the respective dials 302 and 304 through respective gear systems (not shown) that allow for fine adjustment of the wedge prisms. Retainers 270 and 280 are also preferably adapted to be secured in a desired fixed position after their adjustment is complete so that motion or shock associated with weapons fire does not alter the adjustment.

Method of Operation

As illustrated schematically in FIG. 2, adjustable wedge-prism assembly 200 is used to reduce or eliminate the image shift IS between the day optics and the removable night optics that arises due to manufacturing errors in the night optics when the removable night optics is added to the boresight for nighttime use or removed for daytime use. This is achieved by the adjustable wedge-prism assembly introducing a compensating offset to rays 60 so that the image seen by observer 50 has a reduced or eliminated image shift IS. The discussion below sets forth an example method for reducing or eliminating the image shift IS by adjusting adjustable wedge-prism assembly 200.

Figure 5:
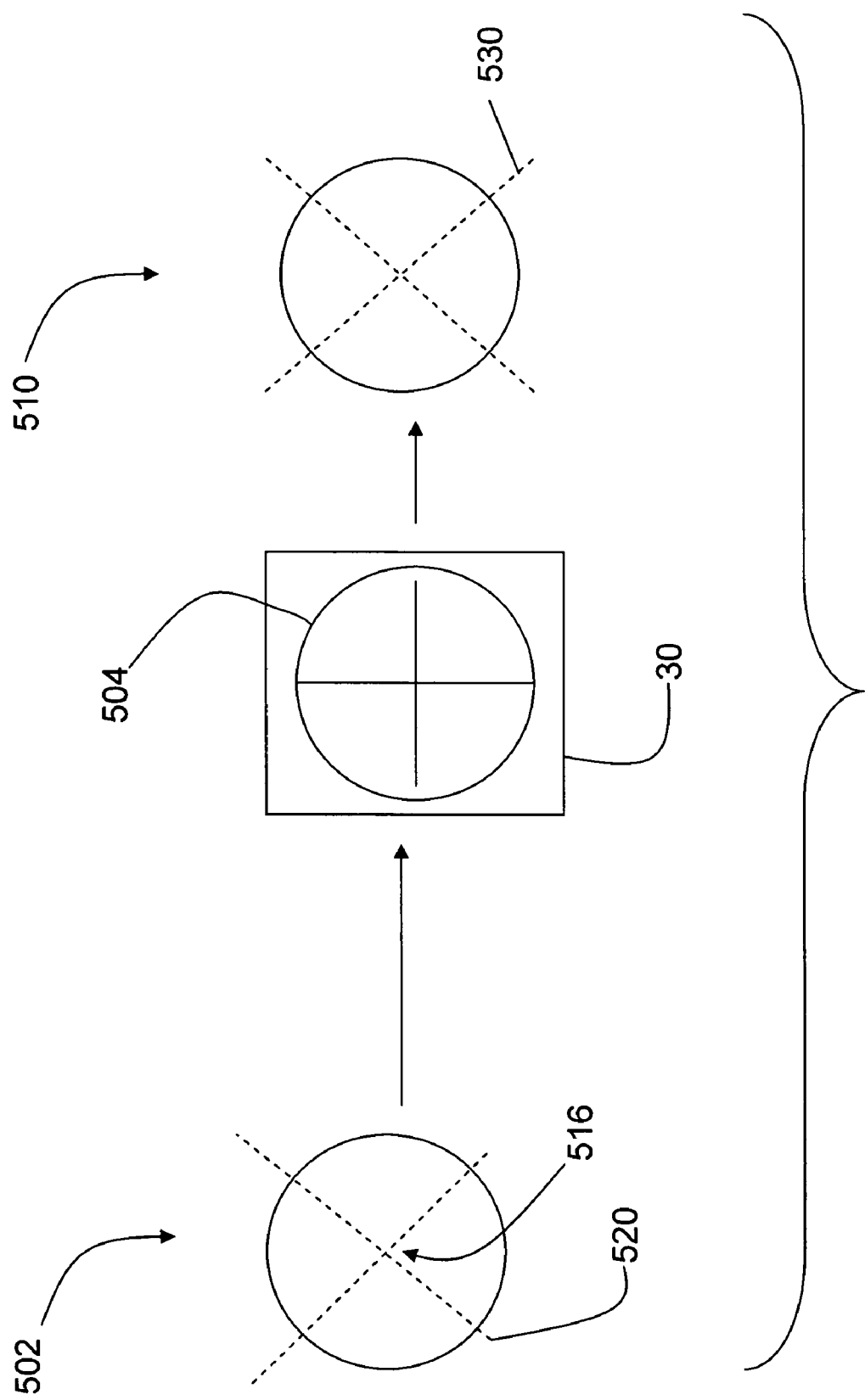
FIG. 5 is a schematic diagram showing a target, day optics with a reticle, and a boresight, illustrating the first step in achieving alignment of the night-day boresight of the present invention.

FIG. 5. is a schematic diagram showing a target 502, day optics 30 with a reticle 504, and a boresight 510, illustrating the first step in achieving alignment of a night-day boresight. First, target 502 is acquired via day optics 30 alone (i.e., night optics 20 is removed from the weapon). Reticle 504 is then adjusted such that a bullet impact point 516 hits the target 502 at the desired point, as indicated by cross-hairs 520 at the target. At this point, boresight 510 is aligned for day optics 20, as indicated by cross-hairs 530 at boresight 510.

Figure 6:
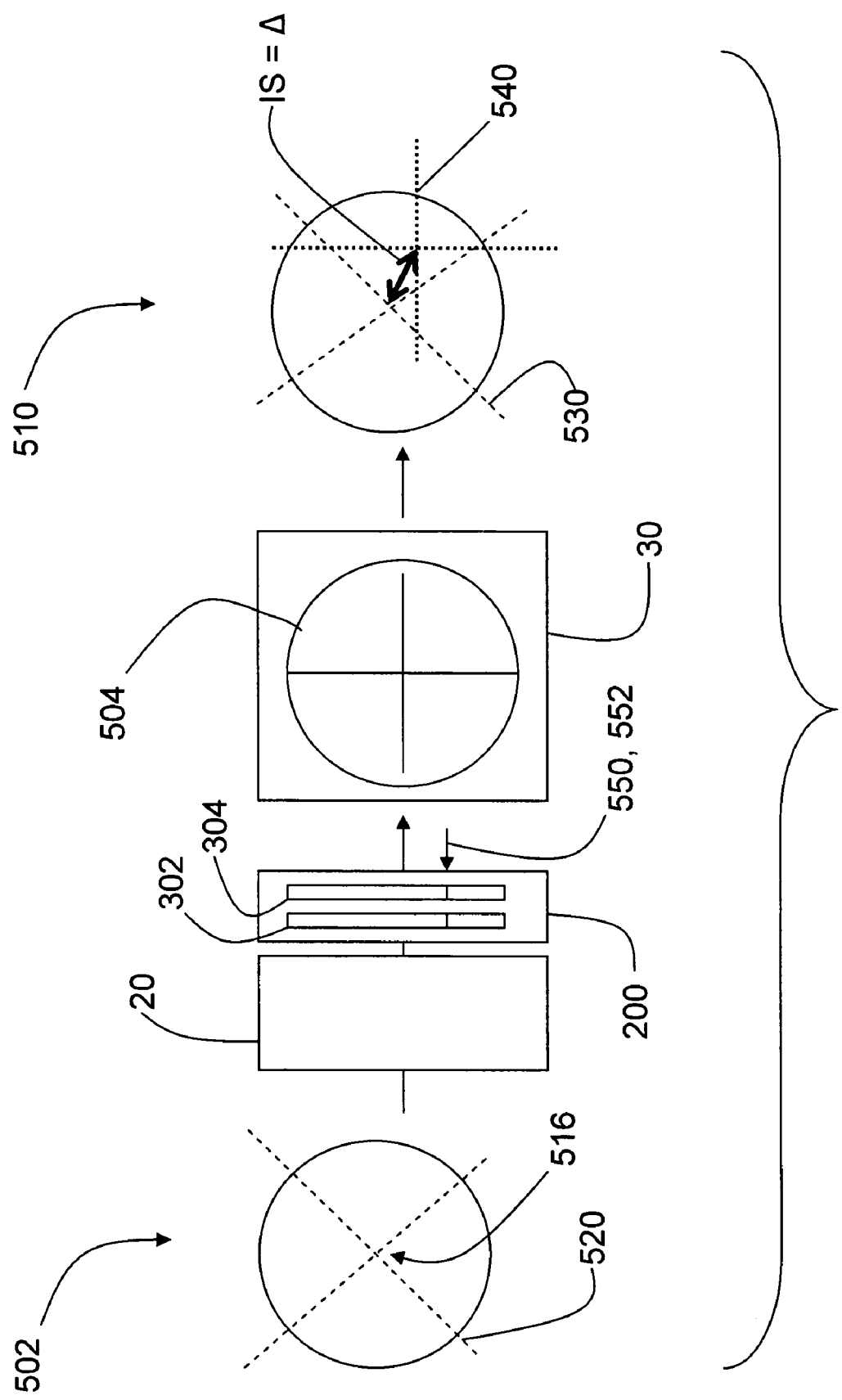
FIG. 6 is similar to FIG. 5, but further including night optics and the adjustable wedge-prism assembly in the optical path between the night and day optics, wherein the adjustable wedge-prism assembly is set to "zero" so that the image shift shows up when light from the target passes through the night optics and day optics.

FIG. 6 is a schematic diagram similar to FIG. 5, but that includes the addition of night optics 20, and adjustable wedge-prism assembly 200, illustrating the second step in achieving alignment of the night-day boresight. Adjustable wedge-prism assembly 200 is arranged in the optical path between night optics 20 and the day optics 20. The introduction of night optics 20 introduces an image shift IS into the otherwise aligned boresight due to the aforementioned manufacturing errors present therein. The shifted image is indicated by shifted crosshairs 540. Note that dials 302 and 304 on adjustable wedge-prism assembly 200 are set to a "zero" position, i.e., a position that introduces no or substantially no image shift. The zero position is indicated by co-linear arrows 552 and 554 that are aligned with respective marks on dials 302 and 304, which are also aligned with each other at the zero position.

Figure 7:
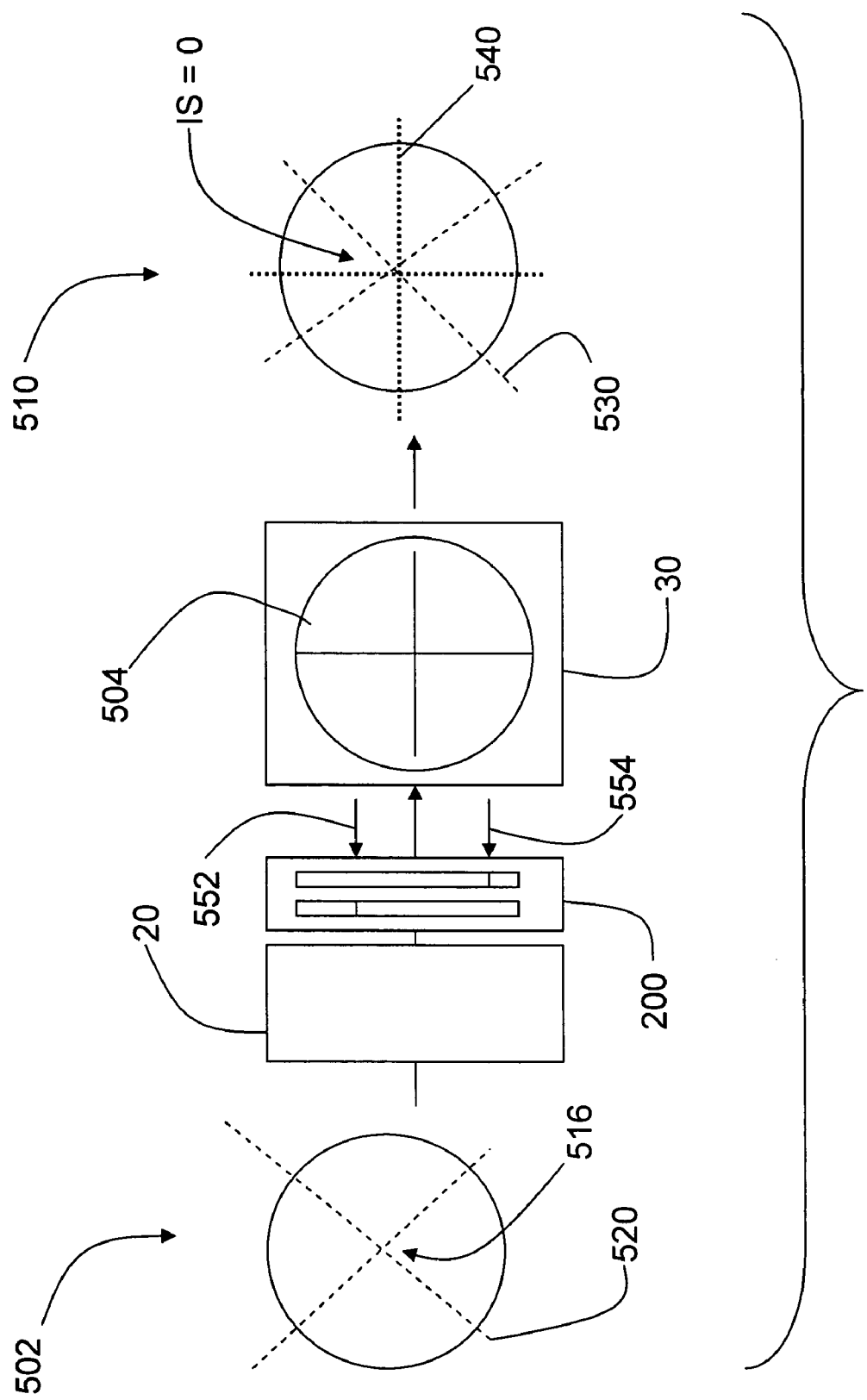
FIG. 7 is similar to FIG. 6, but showing how the image shift is removed via adjustment of the wedge prisms in the adjustable wedge-prism assembly.

FIG. 7 is a schematic diagram similar to FIG. 6 and illustrates the third step in achieving alignment of the night-day boresight 10. In the third step, one or both of prisms 210 and 230 (FIG. 4) of adjustable wedge-prism assembly 200 is/are adjusted (rotated) so that the image shift IS is reduced or eliminated. The adjustment is illustrated by the separation of arrows 552 and 554, which reflects the movement of dials 302 and 304, respectively, from the zero position to the desired image-shift-compensating position. At this position, prisms 210 and 230 introduce an upstream image shift that compensates for (i.e., reduces or eliminates) the image shift IS that occurs in day optics 20 due to the imaging imperfections of night optics 20.

FIG. 2 illustrates the embodiment that eliminates the image shift by showing light rays 60 leaving the adjustable wedge-prism assembly 20 at a shifted trajectory corresponding to that required by day optics 30 to form an image at the unshifted location.

The invention described herein has the advantages of making the alignment of an in-line night-day boresight easier, and making combined night-day boresights less expensive than such prior art boresights and alignment methods. In particular, the compensating capabilities of the present invention allow for relatively loose tolerances on the assembly and manufacturing of the day and night optics, which translates directly into cost reduction of the in-line boresight.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A boresight apparatus that forms an image, comprising:
   night optics arranged along an axis and adapted to be removed from the boresight for use during daytime and added to the boresight for use during nighttime;
   day optics arranged in-line with and optically downstream of the night optics when the night optics is present; and
   an adjustable wedge-prism assembly arranged between the night optics and day optics, the assembly including first and second opposing wedge prisms rotatably adapted to compensate for manufacturing errors in the night optics so that the image remains stationary when the night optics is added to and/or removed from the boresight.

2. The apparatus of claim 1, wherein the night optics has an output end and the wedge-prism assembly is incorporated into the night optics at the output end.

3. The apparatus of claim 1, wherein the first and second wedge prisms are held in respective first and second retainers, and wherein the first and second prism retainers are independently rotatably mounted within an outer housing.

4. The apparatus of claim 3, wherein the first and second retainers are adapted to be manually rotated.

5. The apparatus of claim 1, wherein the first and second wedge prisms have respective first and second wedge angles, and wherein the first and second wedge angles are the same.

6. The apparatus of claim 1, wherein the first and second wedge angles are in the range from about 1' of arc to about 15' of arc.

7. An apparatus for maintaining a position of an image formed by an in-line boresight having removable night optics with manufacturing errors and downstream day optics, comprising
   first and second opposing wedge prisms arranged between the night and day optics; and
   wherein the wedge prisms are independently rotatable so as to compensate for the night optics manufacturing errors in order to maintain the image position when the night optics are removed from or added to the boresight.

8. The apparatus of claim 7, wherein the first and second prisms are identical in shape and size.

9. A method of aligning a boresight having in-line night optics and day optics, comprising:
   determining a first boresight alignment by aligning the day optics to a desired bullet impact point on a target;
   adding the night optics and an adjustable wedge-prism assembly in line and upstream of the day optics, with the adjustable wedge-prism assembly having first and second opposing wedge prisms and arranged between the night optics and the day optics;
   determining an image shift in the desired bullet impact point due to the presence of the night optics; and
   adjusting the adjustable wedge-prism assembly to reduce or eliminate the image shift.

10. The method of claim 9, wherein said adjusting includes rotating at least one of the first and second prisms and observing a reduction in the image shift.

11. The method of claim 10, including providing the adjustable wedge-prism assembly immediately adjacent an output end of the night optics.

12. An in-line boresight alignment method that compensates for an image shift due to manufacturing errors in removable night optics arranged optically upstream of day optics during nghttime use and removed during daytime use, comprising;
   establishing an image location using only the day optics;
   adding the night optics in-line with the day optics and determining a shift in the image relative to the location due to night-optics manufacturing errors; and
   adjusting a wedge-prism assembly attached to either an output end of the night optics or an input end of the day optics so that the image remains stationary at the image location regardless of whether the night optics is present.

* * * * *